United States Patent [19]
Zumstein

[11] 4,378,677
[45] Apr. 5, 1983

[54] BYPASS CONTROL APPARATUS FOR TURBOCHARGED INTERNAL-COMBUSTION ENGINES

[75] Inventor: Bruno Zumstein, Lucerne, Switzerland

[73] Assignee: BBC Brown, Boveri & Company Limited, Baden, Switzerland

[21] Appl. No.: 159,606

[22] Filed: Jun. 16, 1980

[30] Foreign Application Priority Data

Jul. 11, 1979 [CH] Switzerland .......................... 6464/79

[51] Int. Cl.³ ............................................. F02B 37/00
[52] U.S. Cl. ......................................... 60/606; 60/611
[58] Field of Search ................. 60/600, 601, 602, 603, 60/606; 251/129

[56] References Cited

U.S. PATENT DOCUMENTS

| | | | |
|---|---|---|---|
| 1,346,564 | 7/1920 | Sherbondy | 60/602 X |
| 2,234,777 | 3/1941 | Puffer | 60/602 X |
| 2,710,521 | 6/1955 | Nettel | 60/606 X |
| 3,163,984 | 1/1965 | Dumont | 60/606 |
| 3,250,293 | 5/1966 | Adams et al. | 251/129 X |

FOREIGN PATENT DOCUMENTS

| | | | |
|---|---|---|---|
| 624301 | 1/1936 | Fed. Rep. of Germany | 60/602 |
| 740225 | 11/1955 | United Kingdom | 251/129 |

Primary Examiner—Michael Koczo
Attorney, Agent, or Firm—Werner W. Kleeman

[57] ABSTRACT

A bypass control apparatus for turbocharged internal-combustion engines, comprising an actuating cylinder for the bypass valve, wherein the pressure of a fluid medium or fluid in the actuating cylinder is controlled by a fixedly adjustable throttle in the fluid supply pipe or line and a throttle in the fluid discharge pipe or line which is adjustable by electromagnetic means in proportion to the engine speed.

3 Claims, 2 Drawing Figures

4,378,677

BYPASS CONTROL APPARATUS FOR TURBOCHARGED INTERNAL-COMBUSTION ENGINES

CROSS-REFERENCE TO RELATED CASES

This application is related to my commonly assigned U.S. application Ser. No. 06/159,607, filed June 16, 1980, entitled "Bypass Control Apparatus for Turbocharged Internal-Combustion Engines", and my commonly assigned, copending U.S. application Ser. No. 06/159,608, filed June 16, 1980, entitled: "Bypass Control Apparatus for Turbocharged Internal-Combustion Engines".

BACKGROUND OF THE INVENTION

The present invention relates to a new and improved construction of bypass control apparatus for turbocharged internal-combustion engines.

Generally speaking, the bypass control apparatus or mechanism of the present development for turbocharged internal-combustion engines, has an opening characteristic, depending on the engine speed, for a bypass valve located in a bypass pipe which connects a point of a boost air pipe located downstream of a compressor to a point of an exhaust gas pipe located upstream of a turbine inlet.

As is well know in this technology, bypass apparatuses or mechanisms can be used to improve the partial load behavior of turbocharged internal combustion engines. In such cases, a fraction of the compressed boost or charging air, which is a function of the momentary or instantaneous operating state of the engine, is withdrawn through a bypass line or pipe and delivered to a point or location of the exhaust gas pipe located upstream of the exhaust gas turbine. In this way, the engine receives more air than in the case of turbocharging without a bypass. For this purpose the bypass apparatus possesses a bypass valve which may be controlled by any engine load-dependent parameter or quantity and serving as a control magnitude. The valve-lift then is accomplished such that a large quantity of air is transferred during the no-load and lower partial load ranges and with increasing load a progressively decreasing quantity of air is transferred, until the valve completely closes near the full-load point of the engine and the transfer of bypass air is suppressed.

With a heretofore known bypass apparatus or mechanism there is employed, for instance, as the control magnitude or quantity for controlling the bypass air stream, the pressure differential prevailing across the bypass between the compressed boost air and the exhaust at the turbine inlet.

It has already been proposed to utilize the engine speed as a control magnitude or quantity, but to the extent presently known, this concept has not yet been realized.

SUMMARY OF THE INVENTION

It is a primary object of the present invention to provide a new and improved bypass control apparatus for turbocharged internal-combustion engines wherein the engine speed is beneficially employed as a control quantity or magnitude for controlling the bypass air stream.

Still a further significant object of the present invention aims at providing a new and improved construction of bypass control apparatus for turbocharged internal-combustion engines, which is relatively simple in construction and design, economical to manufacture, extremely reliable in operation, requires very little maintenance and servicing and enables utilization of the engine speed as a control quantity or parameter for controlling the bypass air stream.

Now in order to implement these and still further objects of the invention, which will become more readily apparent as the description proceeds, the bypass control apparatus of the present development is manifested by the features that there is provided a pipe or line intended to accommodate a fluid stream, which fluid or fluid stream serves as work medium for the actuation of the bypass valve and originates from a fluid source dependent upon the engine or an external fluid source. A section of the pipe or line is located between a supply pipe and a discharge pipe, this pipe or line section having a fixedly adjustable throttle valve and a spring-loaded control throttle valve. There is also provided an electrical signal transducer equipped with an amplifier, and a proportional electromagnet powered by the amplifier by means of a signal line, wherein the armature of the electromagnet is rigidly connected to the control throttle valve.

The inventive arrangement of bypass control apparatus arose from the desire to develop a bypass control apparatus wherein the engine speed could be beneficially utilized as the control magnitude or quantity. The reason for this was the planned use of such bypass control apparatus preferably in conjunction with vehicle engines, for which the engine speed is particularly suitable as the control magnitude or quantity.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
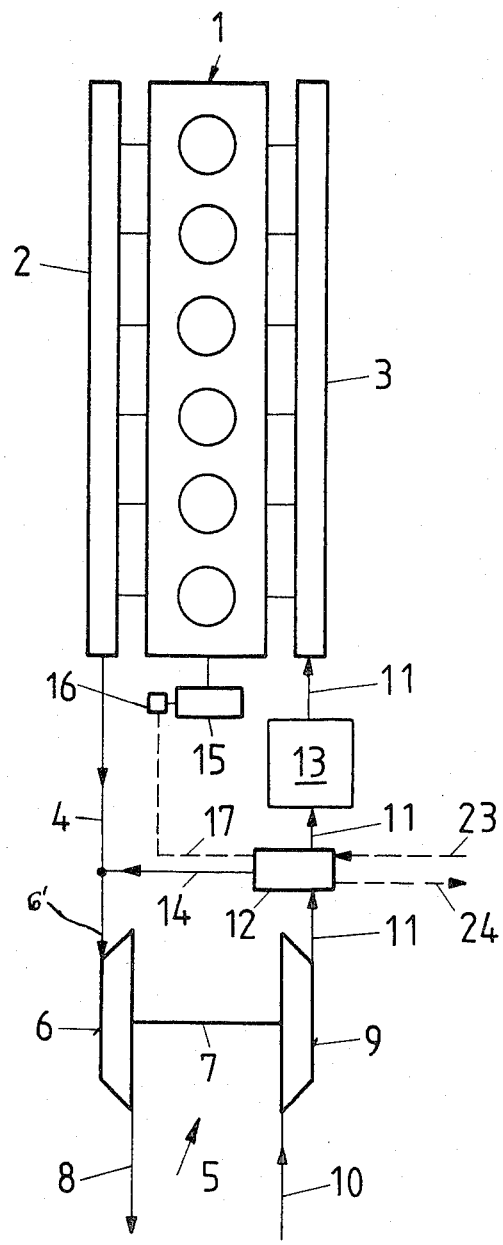
FIG. 1 schematically illustrates a turbocharged engine provided with a bypass control apparatus according to the invention.

Describing now the drawings, in FIG. 1 there is schematically illustrated a six-cylinder turbocharged engine 1 which contains an exhaust gas manifold 2 and a boost air container or receiver 3. The exhaust gases pass through an exhaust gas pipe or conduit 4 into an exhaust gas turbine 6 of a turbocharger 5, leaving the latter through an exhaust pipe or conduit 8. The exhaust gas turbine 6 is connected by means of a shaft 7 with a compressor 9, which sucks in air through an intake pipe or line 10 and forces such sucked-in air, in a compressed state, by means of a boost or charge air pipe or line 11 through a bypass control housing 12 into a boost air cooler 13 and further into the boost air container or receiver 3, from which the cylinders of the engine 1 receive their combustion air. A bypass pipe or line 14 connects the bypass control housing 12 to a point of the exhaust gas pipe 4 which is located upstream of the inlet 6' into the turbine 6. The bypass control apparatus further comprises a conventional electrical speed transducer provided with an amplifier, as generally schematically indicated by reference character 16, adapted to be driven by the flywheel 15, and delivering current for the speed indication and to actuate a proportional electromagnetic means 27. A signal line or conductor 17 extends between the speed transducer and amplifier 16 and a control housing 12.

Figure 2:
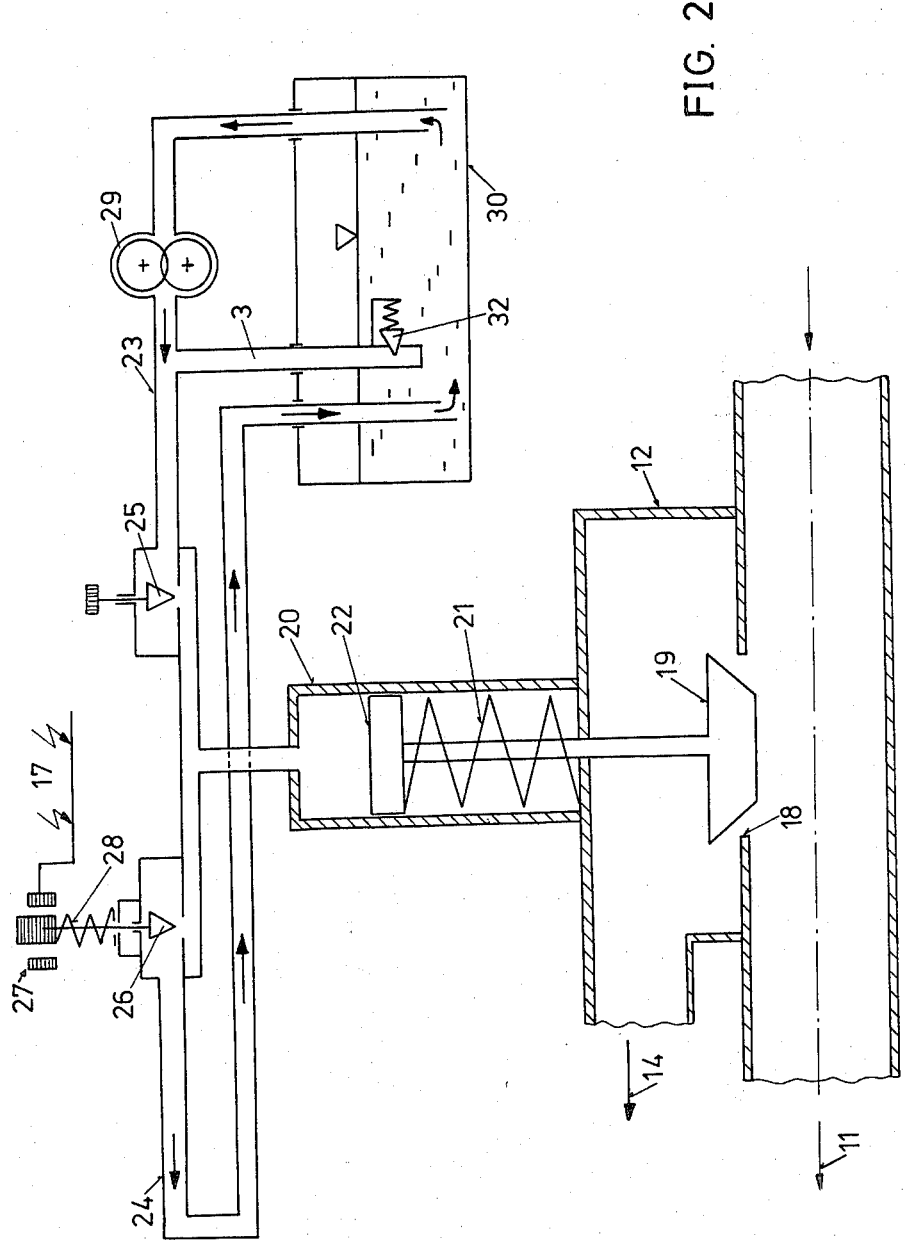
FIG. 2 illustrates details of the bypass control apparatus according to the invention used in the arrangement of FIG. 1.

Details of the bypass control mechanism or apparatus have been illustrated schematically in FIG. 2. The control housing 12 of the bypass control apparatus communicates by means of a valve orifice or opening 18 with the boost air pipe or line 11, and by means of the bypass pipe 14 with the exhaust gas pipe 4. The bypass valve 19, cooperating with the valve orifice or opening 18, defining a valve seat, is constructed as a disk or plate valve 19' which is provided at the upper end of its valve stem 19" with a piston 22 which is slidable within an actuating cylinder 20 and loaded by a compression or pressure spring 21 or equivalent structure.

The bypass control apparatus utilizes as the work or working medium for control purposes a fluid medium which is under approximately constant pressure, such as air from a pressurized air system, oil from a hydraulic unit or also from the lubricating oil system of the engine, there being present in the apparatus its own gear pump 29. line for the work medium are respectively designated by reference characters 23 and 24 in each of FIGS. 1 and 2.

The gear pump 29 sucks oil out of an oil tank 30, and said oil, after passing through the throttle elements 25 and 26, flows back into the oil tank 30 via the discharge pipe or line 24. A spring-loaded pressure release valve 32 in an overflow pipe 31 serves to maintain a constant pressure forward of the throttle valve 25.

The section of the work medium pipe or line located between the supply pipe or line 23 and the discharge pipe or line 24 contains a throttle valve 25 fixedly adjustable for a specific engine, which limits the maximum mass flow of the work medium through the valve, and a control throttle valve 26 which controls, as a function of the speed, the flow cross-section or throughflow cross-section through its valve seat 26', and thus, the work medium pressure between both of the throttle valves 25 and 26, and hence, above the piston 22 of the actuating cylinder 20. By appropriate adjustment of the throttle valve 25, there can be adjusted for a given engine the pressure required in the actuating cylinder 20, and thus, the adjustment or control forces for the actuation of the bypass valve 19.

The actuation of the control throttle valve 26 as a function of the engine speed is effected by the proportional electromagnet 27, the armature or core 27' of which is rigidly connected with the control throttle valve 26. This armature 27' is drawn further into the stator or coils 27" of the electromagnetic means or electromagnet 27, against the resistance of a compression or pressure spring 28 or equivalent structure, with increasing intensity of the signal which is transmitted by the signal line or conductor 17 from the signal transducer and amplifier means 16, until it completely closes the throttle cross-section, i.e. the valve seat 26', near the maximum power speed of the internal-combustion engine 1. The adjustment or control force applied to the piston 22 thus reaches a maximum, the bypass valve 19 is therefore completely closed, and the bypass of compressed boost or charging air is totally interrupted.

The outlet signal generated by the signal transducer and amplifier means 16 (also briefly referred to sometimes simply as signal transducer) is transformed by the amplifier thereof into a voltage proportional to the rotational speed of the engine, which is then transformed by the proportional electromagnet or electromagnetic means 27 into the desired speed-dependent adjustment of the control throttle valve 26 and of the bypass valve 19 and thus of the bypass flow or stream.

In order to prevent any recirculation of the exhaust gases in the starting phase and under low power, the amplifier of the signal transducer may be expanded by an element which ensures that the bypass valve remains closed in the lowest speed range.

It would also be possible to integrate into the control system a microprocessor, so that any desired valve-lift curve can be realized as a defined function of the engine speed.

While there are shown and described present preferred embodiments of the invention, it is to be distinctly understood that the invention is not limited thereto but may be otherwise variously embodied and practised within the scope of the following claims. ACCORDINGLY,

What I claim is:

1. In a bypass control apparatus for turbocharged internal-combustion engines having an opening characteristic, depending upon the engine speed, for a bypass valve located in a bypass pipe which connects a point of a boost air pipe located downstream of a compressor to a point of an exhaust gas pipe located upsteam of a turbine inlet of a turbocharger for the engine, the improvement which comprises:

a flow pipe intended to accommodate a fluid stream for flow therethrough and flow communicating with the bypass valve;
   said fluid stream serving as a work medium for actuation of the bypass valve;
   fluid source for delivering said fluid stream to said flow pipe;
   a supply pipe operatively associated with said fluid source means for receiving said fluid stream;
   a discharge pipe flow communicating with said supply pipe for the outflow of said fluid stream;
   said flow pipe extending between said supply pipe and said discharge pipe to define a pipe section;
   a fixedly adjustable throttle valve provided for said pipe section;
   a spring-loaded control throttle valve provided for said pipe section;
   electrical signal transducer and amplifier means for operating said spring-loaded control throttle valve as a function of the speed of the engine;
   proportional electromagnetic means including an armature;
   a signal line connecting the amplifier with said proportional electromagnetic means; and
   said armature being rigidly connected with said control throttle valve for controlling operation of said control throttle valve as a function of the speed of the engine.

2. The improvement as defined in claim 1, wherein:
   said fluid source means comprises an engine-driven pump delivering the fluid stream under approximately constant pressure.

3. The improvement as defined in claim 1, wherein:
   said fluid source means comprises an external source of fluid with respect to the engine.

* * * * *